US012581372B2

(12) United States Patent
Shi et al.

(10) Patent No.: US 12,581,372 B2
(45) Date of Patent: Mar. 17, 2026

(54) NETWORK-TO-NETWORK REDIRECTION AND PING-PONG IMPROVEMENTS

(71) Applicant: QUALCOMM Incorporated, San Diego, CA (US)

(72) Inventors: Dunfa Shi, Beijing (CN); Sharda Ranjan, Hyderabad (IN); Naga Chandan Babu Gudivada, Hyderabad (IN); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 18/261,228

(22) PCT Filed: Apr. 1, 2021

(86) PCT No.: PCT/CN2021/084840
§ 371 (c)(1),
(2) Date: Jul. 12, 2023

(87) PCT Pub. No.: WO2022/205274
PCT Pub. Date: Oct. 6, 2022

(65) Prior Publication Data
US 2024/0073747 A1 Feb. 29, 2024

(51) Int. Cl.
*H04W 36/00* (2009.01)
*H04W 36/14* (2009.01)
*H04W 36/30* (2009.01)

(52) U.S. Cl.
CPC ... *H04W 36/0058* (2018.08); *H04W 36/0072* (2013.01); *H04W 36/00837* (2018.08); *H04W 36/304* (2023.05); *H04W 36/1443* (2023.05)

(58) Field of Classification Search
CPC . H04W 24/10; H04W 36/0085; H04W 48/18; H04W 36/00837; H04W 36/0058;
(Continued)

(56) References Cited

U.S. PATENT DOCUMENTS 11,700,564 B2 * 7/2023 Gandhi ............... H04W 28/086
370/331
2010/0124931 A1 * 5/2010 Eskicioglu .............. H04W 8/08
455/440
(Continued)

FOREIGN PATENT DOCUMENTS

| CN | 101772063 A | 7/2010 | |
| WO | WO-2010058375 A1 * | 5/2010 | ......... H04W 36/326 |
| WO | 2017177452 A1 | 10/2017 | |

OTHER PUBLICATIONS

International Search Report and Written Opinion—PCT/CN2021/084840—ISA/EPO—Dec. 31, 2021.
(Continued)

*Primary Examiner* — Dung Hong
(74) *Attorney, Agent, or Firm* — Harrity & Harrity, LLP

(57) ABSTRACT

In some implementations, a user equipment (UE) may detect a trigger to provide a measurement report associated with a redirection from a first radio access technology (RAT) to a second RAT. The trigger may be a reference signal metric associated with the second RAT satisfying a threshold associated with the reference signal metric. The threshold may be configured by a base station. The UE may selectively provide the measurement report based at least in part on whether one or more other reference signal metrics satisfy one or more other thresholds corresponding to the one or more other reference signal metrics. Numerous other aspects are provided.

27 Claims, 9 Drawing Sheets

300 ➞

305
RAT2 reference signal metric satisfies threshold
⇩
Measurement report trigger associated with redirection from RAT1 to RAT2

UE

310
Selectively provide measurement report based at least in part on whether other reference signal metric(s) satisfy corresponding threshold(s)

Base station (RAT1)

(58) Field of Classification Search
CPC .......... H04W 36/304; H04W 36/0072; H04W
36/1443
See application file for complete search history.

(56) References Cited

U.S. PATENT DOCUMENTS

| | | | | |
|---|---|---|---|---|
| 2012/0213162 A1* | 8/2012 | Koo | ...................... | H04W 88/10 |
| | | | | 370/329 |
| 2013/0115994 A1* | 5/2013 | Awoniyi | .............. | H04W 24/10 |
| | | | | 455/517 |
| 2014/0038609 A1 | 2/2014 | Henttonen et al. | | |
| 2015/0099523 A1* | 4/2015 | Yang | ................... | H04W 36/302 |
| | | | | 455/438 |
| 2016/0135100 A1* | 5/2016 | Teyeb | ................... | H04W 36/22 |
| | | | | 370/331 |
| 2017/0318515 A1* | 11/2017 | Arora | ................ | H04W 36/0085 |
| 2020/0015133 A1* | 1/2020 | Yang | ................... | H04W 36/302 |
| 2022/0232572 A1* | 7/2022 | Krishna | ................ | H04W 76/11 |

OTHER PUBLICATIONS

ITRI: "Redirection Among RATs," 3GPP TSG-RAN WG2 Meeting#96, Tdoc R2-168076, Reno, USA, Nov. 14-18, 2016, (Nov. 18, 2016), 2 pages, pp. 1-2.
Mediatek Inc: "Avoiding Inter-System Ping-Pong due to Redirection," 3GPP TSG-CT WG1 Meeting #125-e, C1-205546 was C1-205168, Electronic meeting, Aug. 20-28, 2020, (Aug. 28, 2020), 4 pages, the whole document.
Supplementary Partial European Search Report—EP21933934—Search Authority—Munich—Nov. 13, 2024.
Supplementary European Search Report—EP21933934—Search Authority—The Hague—Feb. 3, 2025.

* cited by examiner

300

305

RAT2 reference signal metric satisfies threshold

Measurement report trigger associated with redirection from RAT1 to RAT2

UE

310

Selectively provide measurement report based at least in part on whether other reference signal metric(s) satisfy corresponding threshold(s)

Base station (RAT1)

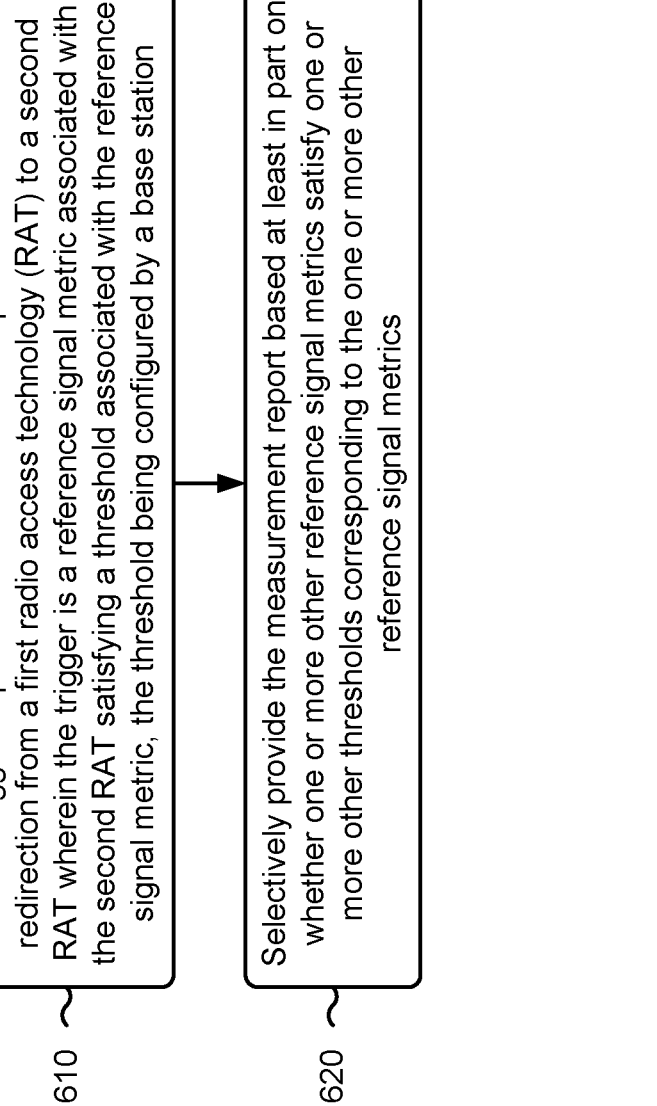

610 — Detect a trigger to provide a measurement report associated with a redirection from a first radio access technology (RAT) to a second RAT wherein the trigger is a reference signal metric associated with the second RAT satisfying a threshold associated with the reference signal metric, the threshold being configured by a base station 620 — Selectively provide the measurement report based at least in part on whether one or more other reference signal metrics satisfy one or more other thresholds corresponding to the one or more other reference signal metrics

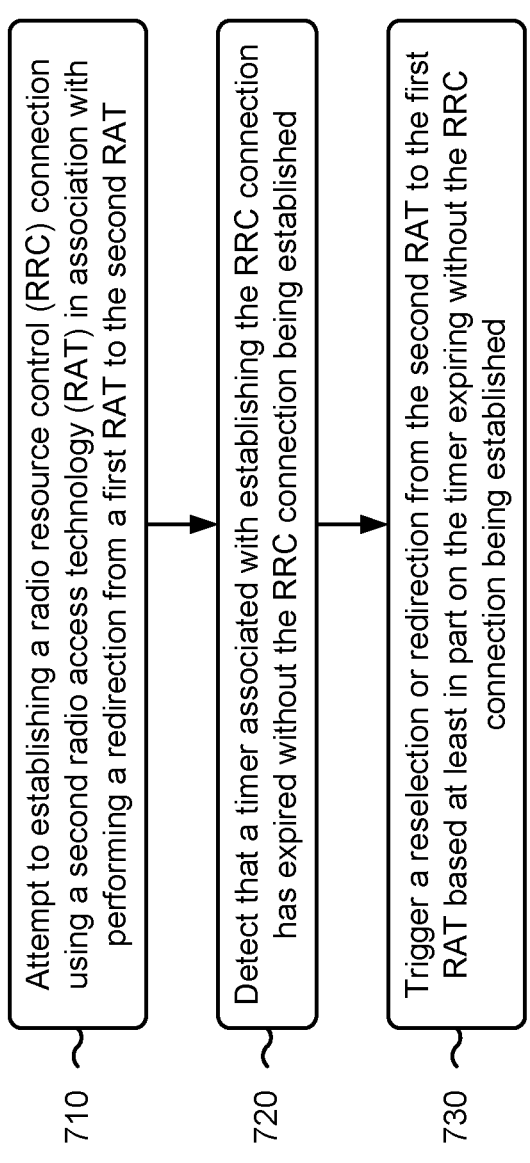

710 — Attempt to establishing a radio resource control (RRC) connection using a second radio access technology (RAT) in association with performing a redirection from a first RAT to the second RAT 720 — Detect that a timer associated with establishing the RRC connection has expired without the RRC connection being established 730 — Trigger a reselection or redirection from the second RAT to the first RAT based at least in part on the timer expiring without the RRC connection being established

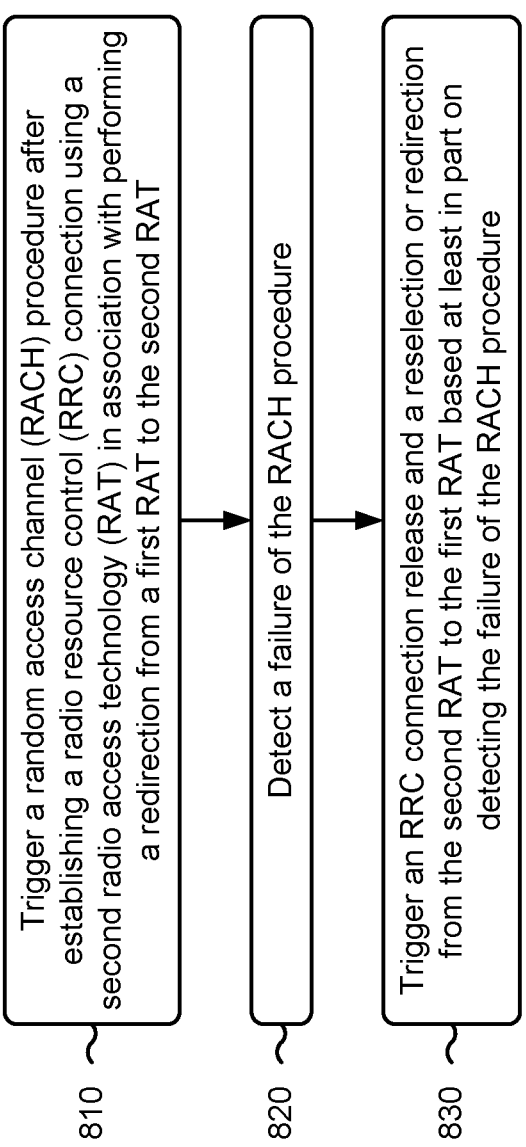

810 — Trigger a random access channel (RACH) procedure after establishing a radio resource control (RRC) connection using a second radio access technology (RAT) in association with performing a redirection from a first RAT to the second RAT 820 — Detect a failure of the RACH procedure 830 — Trigger an RRC connection release and a reselection or redirection from the second RAT to the first RAT based at least in part on detecting the failure of the RACH procedure

NETWORK-TO-NETWORK REDIRECTION AND PING-PONG IMPROVEMENTS

CROSS-REFERENCE TO RELATED APPLICATION

This Patent Application is a 371 National Phase of PCT Application No. PCT/CN2021/084840, filed Apr. 1, 2021, entitled "NETWORK-TO-NETWORK REDIRECTION AND PING-PONG IMPROVEMENTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for network to network (e.g., inter-radio access technology (RAT)) redirection and ping-pong improvements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes detecting a trigger to provide a measurement report associated with a redirection from a first radio access technology (RAT) to a second RAT, wherein the trigger is a reference signal metric associated with the second RAT satisfying a threshold associated with the reference signal metric, the threshold being configured by a base station; and selectively providing the measurement report based at least in part on whether one or more other reference signal metrics satisfy one or more other thresholds corresponding to the one or more other reference signal metrics.

In some aspects, a method of wireless communication performed by a UE includes attempting to establishing a radio resource control (RRC) connection using a second RAT in association with performing a redirection from a first RAT to the second RAT; detecting that a timer associated with establishing the RRC connection has expired without the RRC connection being established; and triggering a reselection or redirection from the second RAT to the first RAT based at least in part on the timer expiring without the RRC connection being established.

In some aspects, a method of wireless communication performed by a UE includes triggering a random access channel (RACH) procedure after establishing an RRC connection using a second RAT in association with performing a redirection from a first RAT to the second RAT; detecting a failure of the RACH procedure; and triggering an RRC connection release and a reselection or redirection from the second RAT to the first RAT based at least in part on detecting the failure of the RACH procedure.

In some aspects, a UE for wireless communication includes a memory; and one or more processors, coupled to the memory, configured to: detect a trigger to provide a measurement report associated with a redirection from a first RAT to a second RAT, wherein the trigger is a reference signal metric associated with the second RAT satisfying a threshold associated with the reference signal metric, the threshold being configured by a base station; and selectively provide the measurement report based at least in part on whether one or more other reference signal metrics satisfy one or more other thresholds corresponding to the one or more other reference signal metrics.

In some aspects, a UE for wireless communication includes a memory; and one or more processors, coupled to the memory, configured to: attempt to establishing an RRC connection using a second RAT in association with performing a redirection from a first RAT to the second RAT; detect that a timer associated with establishing the RRC connection has expired without the RRC connection being established; and trigger a reselection or redirection from the second RAT to the first RAT based at least in part on the timer expiring without the RRC connection being established.

In some aspects, a UE for wireless communication includes a memory; and one or more processors, coupled to the memory, configured to: trigger a RACH procedure after establishing an RRC connection using a second RAT in association with performing a redirection from a first RAT to the second RAT; detect a failure of the RACH procedure; and trigger an RRC connection release and a reselection or redirection from the second RAT to the first RAT based at least in part on detecting the failure of the RACH procedure.

In some aspects, a non-transitory computer-readable medium storing a set of instructions for wireless communication includes one or more instructions that, when executed by one or more processors of a UE, cause the UE to: detect a trigger to provide a measurement report associated with a redirection from a first RAT to a second RAT, wherein the trigger is a reference signal metric associated with the second RAT satisfying a threshold associated with the reference signal metric, the threshold being configured by a base station; and selectively provide the measurement report based at least in part on whether one or more other reference signal metrics satisfy one or more other thresholds corresponding to the one or more other reference signal metrics.

In some aspects, a non-transitory computer-readable medium storing a set of instructions for wireless communication includes one or more instructions that, when executed by one or more processors of an UE, cause the UE to: attempt to establishing an RRC connection using a second RAT in association with performing a redirection from a first RAT to the second RAT; detect that a timer associated with establishing the RRC connection has expired without the RRC connection being established; and trigger a reselection or redirection from the second RAT to the first RAT based at least in part on the timer expiring without the RRC connection being established.

In some aspects, a non-transitory computer-readable medium storing a set of instructions for wireless communication includes one or more instructions that, when executed by one or more processors of an UE, cause the UE to: trigger a RACH procedure after establishing an RRC connection using a second RAT in association with performing a redirection from a first RAT to the second RAT; detect a failure of the RACH procedure; and trigger an RRC connection release and a reselection or redirection from the second RAT to the first RAT based at least in part on detecting the failure of the RACH procedure.

In some aspects, an apparatus for wireless communication includes means for detecting a trigger to provide a measurement report associated with a redirection from a first RAT to a second RAT, wherein the trigger is a reference signal metric associated with the second RAT satisfying a threshold associated with the reference signal metric, the threshold being configured by a base station; and means for selectively providing the measurement report based at least in part on whether one or more other reference signal metrics satisfy one or more other thresholds corresponding to the one or more other reference signal metrics.

In some aspects, an apparatus for wireless communication includes means for attempting to establishing an RRC connection using a second RAT in association with performing a redirection from a first RAT to the second RAT; means for detecting that a timer associated with establishing the RRC connection has expired without the RRC connection being established; and means for triggering a reselection or redirection from the second RAT to the first RAT based at least in part on the timer expiring without the RRC connection being established.

In some aspects, an apparatus for wireless communication includes means for triggering a RACH procedure after establishing an RRC connection using a second RAT in association with performing a redirection from a first RAT to the second RAT; means for detecting a failure of the RACH procedure; and means for triggering an RRC connection release and a reselection or redirection from the second RAT to the first RAT based at least in part on detecting the failure of the RACH procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-8 are diagrams illustrating example processes associated with network-to-network (e.g., inter-RAT) redirection and ping-pong improvements, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
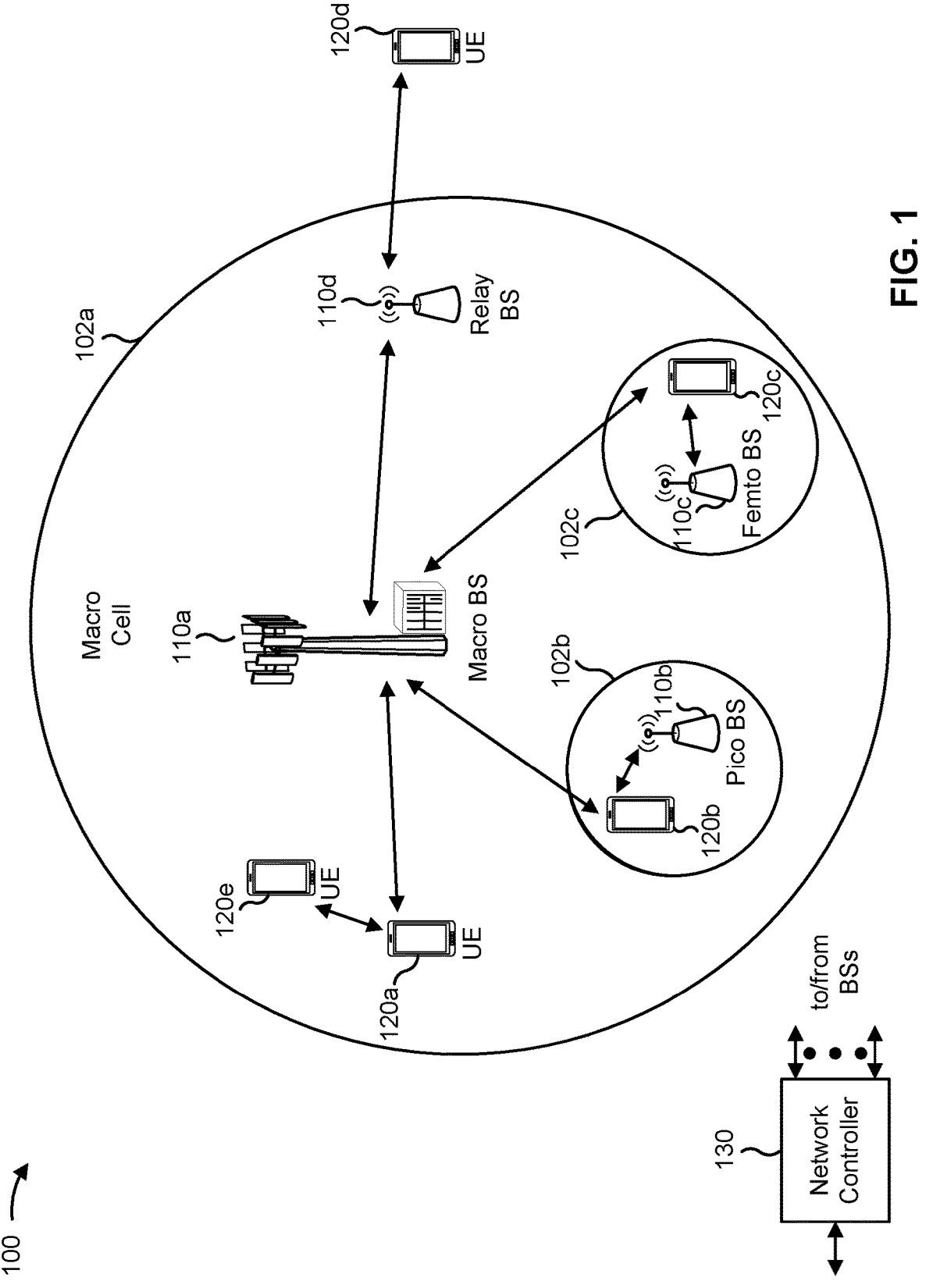
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gN", "TR", "AP," "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave"

band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
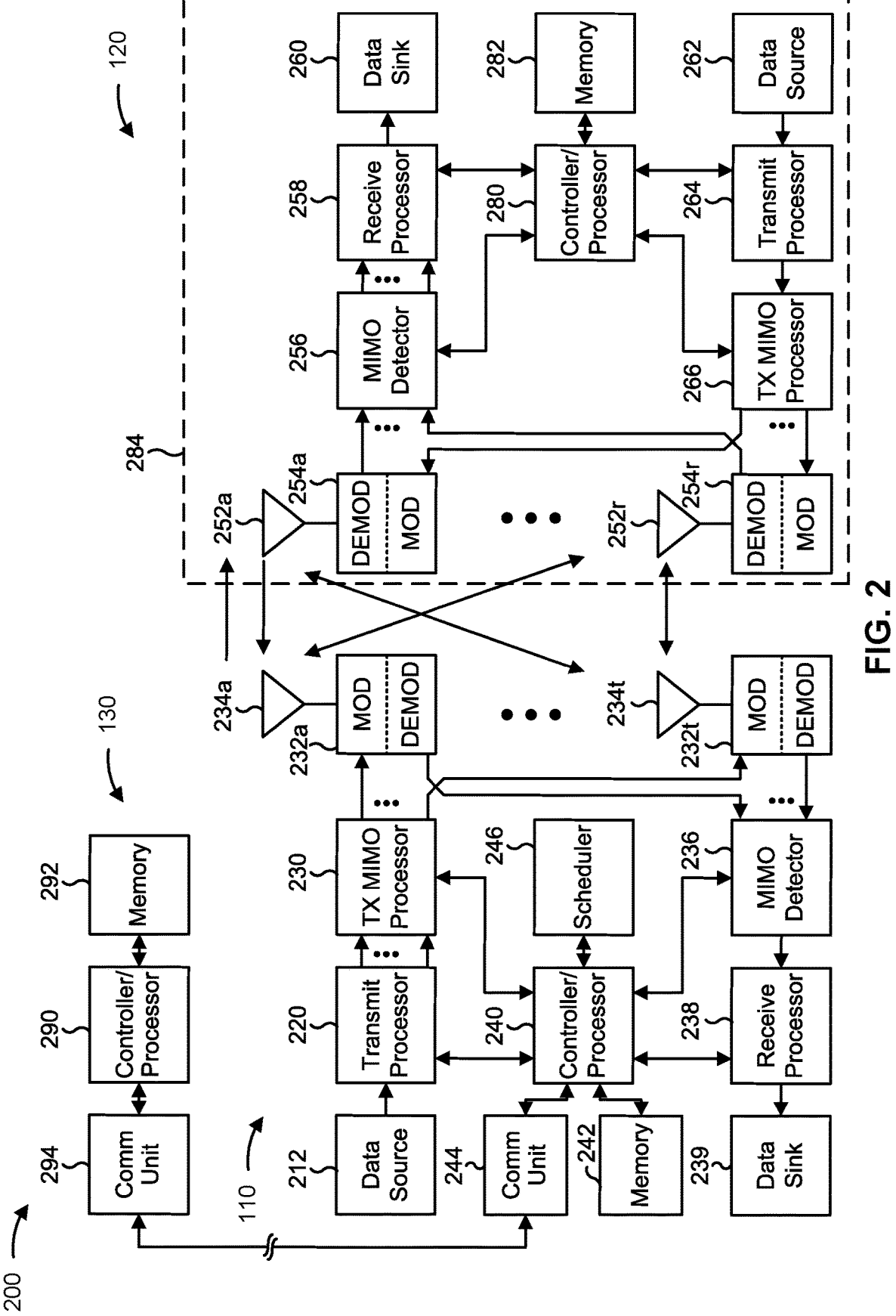
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-8.

Controller/processor 240 of base station 110, controller/processor 280 of UE 120, and/or any other component(s) of FIG. 2 may perform one or more techniques associated with network-to-network (e.g., inter-RAT) redirection and ping-pong improvements, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for detecting a trigger to provide a measurement report associated with a redirection from a first RAT to a second RAT, wherein the trigger is a reference signal metric associated with the second RAT satisfying a threshold associated with the reference signal metric, the threshold being configured by a base station; or means for selectively providing the measurement report based at least in part on whether one or more other reference signal metrics satisfy one or more other thresholds corresponding to the one or more other reference signal metrics. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for attempting to establishing an RRC connection using a second RAT in association with performing a redirection from a first RAT to the second RAT; means for detecting that a timer associated with establishing the RRC connection has expired without the RRC connection being established; or means for triggering a reselection or redirection from the second RAT to the first RAT based at least in part on the timer expiring without the RRC connection being established. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for triggering a RACH procedure after establishing an RRC connection using a second RAT in association with performing a redirection from a first RAT to the second RAT; means for detecting a failure of the RACH procedure; or means for triggering an RRC connection release and a reselection or redirection from the second RAT to the first RAT based at least in part on detecting the failure of the RACH procedure. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some wireless communication systems, a network (e.g., using a base station) may initiate a redirection of a UE from a first RAT to a second RAT. Such redirection is herein referred to as a network-to-network or inter-RAT redirection. One example of such a redirection is an LTE-to-NR redirection. Taking an LTE-to NR redirection as an example, the network may configure the UE with a measurement object indicating an RSRP threshold for a target NR cell. Here, the measurement object configures the UE to detect that a measurement reporting event (e.g., a B1 event, a B2 event, or the like) has occurred when the RSRP of the target NR cell satisfies (e.g., is greater than or equal to) the RSRP threshold. In operation, the UE monitors (e.g., periodically measures) the RSRP of the target NR cell, and when the UE detects that the RSRP of the target NR cell satisfies the threshold, the UE detects the measurement reporting event. The UE then provides a measurement report indicating that the RSRP of the target NR cell satisfies the threshold to the network. The network receives the measurement report and triggers the UE to initiate a redirection to from LTE to NR.

Notably, in the above described operation, the measurement object configured by the network specifies only the RSRP threshold for the target NR cell (e.g., an RSRQ threshold for the target NR cell and a signal-to-noise ratio (SNR) threshold for the reference signal associated with the target NR cell are optional and, thus, are not always configured by the base station). Configuration of the measurement object including only the RSRP threshold can result in an LTE-to-NR redirection being initiated by the network for a poor target NR cell (e.g., an NR cell for which the RSRP is acceptable, but the RSRQ and/or the SNR are poor due to high interference). Redirection to a poor target NR cell increases delay, degrades throughput, wastes network resources, wastes UE resources (e.g., processor resources or battery power, among other examples), and degrades user experience (e.g., whether the UE is able to connect to the poor target NR cell or is unable to connect to the poor target NR cell). Further, redirection to a poor target NR cell can result in the UE ping-ponging back-and-forth between LTE and NR, which further wastes networks and UE resources and further degrades user experience. Notably, this issue can occur when the UE is operating in an RRC idle mode or is operating in an RRC connected mode.

Some techniques and apparatuses described herein provide inter-RAT redirection and ping-pong improvements. In some aspects, a UE may detect a trigger to provide a measurement report associated with a redirection from a first RAT to a second RAT. Here, the trigger may be a reference signal metric associated with the second RAT satisfying a threshold associated with the reference signal metric, and the threshold may be configured by a base station. In some aspects, the UE may then selectively provide the measurement report based at least in part on whether one or more other reference signal metrics satisfy one or more other thresholds corresponding to the one or more other reference signal metrics.

In some aspects, a UE may attempt to establishing a radio resource control (RRC) connection using the second RAT in association with performing the redirection from a first RAT to the second RAT (e.g., after the UE provides the measurement report). In some aspects, the UE may detect that a timer associated with establishing the RRC connection has expired without the RRC connection being established, and the UE may trigger a reselection or redirection from the second RAT to the first RAT based at least in part on the timer expiring without the RRC connection being established.

In some aspects, a UE may trigger a RACH procedure after establishing an RRC connection using a second RAT in association with performing the redirection from a first RAT to the second RAT. In some aspects, the UE may detect a failure of the RACH procedure and may trigger an RRC connection release and a reselection or redirection from the second RAT to the first RAT based at least in part on detecting the failure of the RACH procedure.

Notably, while some examples described herein are described in the context of LTE-to-NR redirection, the techniques and apparatuses described herein can apply to another type of inter-RAT redirection, such as an LTE-to-frequency range 1 (FR1) redirection, an LTE-to-frequency range 2 (FR2) redirection, an FR1-to-FR2 redirection, an NR-to-LTE redirection, an FR1-to LTE redirection, an FR2-to-LTE redirection, or an FR2-to-FR1 redirection, among other examples.

Figure 3:
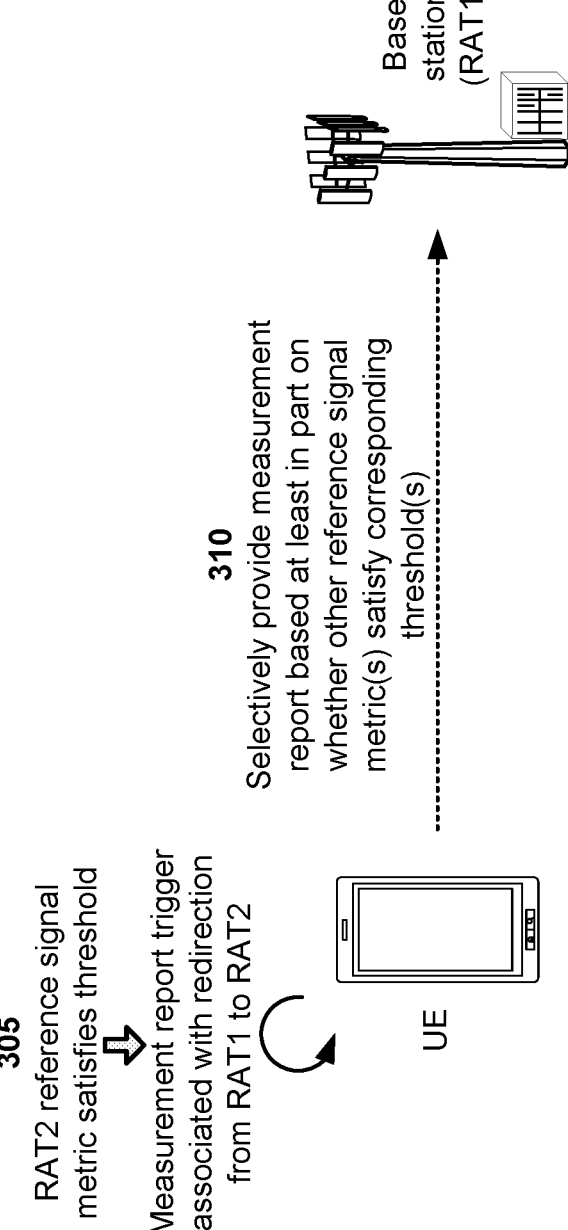
FIGS. 3-5 are diagrams illustrating examples associated with network-to-network (e.g., inter-radio access technology (RAT)) redirection and ping-pong improvements, in accordance with the present disclosure.

FIG. 3 is a diagram illustrating an example 300 associated with inter-RAT redirection and ping-pong improvements, in accordance with the present disclosure. As shown in FIG. 3, example 300 includes communication between a UE (e.g., a UE 120) and a base station (e.g., a base station 110). In some aspects, the base station and the UE may be included in a wireless network (e.g., a wireless network 100). The base station and the UE may communicate via a wireless access link, which may include an uplink and a downlink.

As shown by reference 305 in FIG. 3, in some aspects, the UE may detect a trigger to provide a measurement report associated with a redirection from the first RAT (herein referred to as RAT1) to a second RAT (herein referred to as RAT2). In some aspects, RAT1 may be LTE, and RAT2 may be NR. In some aspects, the trigger may be a reference signal metric associated with RAT2 satisfying a threshold associated with the reference signal metric. In some aspects, the threshold is configured by the base station.

For example, the UE may be connected to the base station using RAT1, as indicated in FIG. 3. Here, the base station may configure the UE with a measurement object indicating a threshold for a reference signal metric (e.g., a threshold for an RSRP) for a target cell of RAT2. Here, the measurement object may configure the UE to detect that a measurement reporting event (e.g., a B1 event, a B2 event, or the like) has occurred when the reference signal metric of the target cell of RAT2 satisfies (e.g., is greater than or equal to) the configured threshold. In this example, the UE monitors (e.g., periodically measures) the reference signal metric of the target NR cell (not shown). Here, if the UE detects that the reference signal metric of the target RAT2 cell of satisfies the threshold, then the UE detects the trigger to provide the measurement report. Notably, in this example, the trigger is an RSRP associated with RAT2 satisfying an RSRP threshold configured by the base station.

In some aspects, as shown by reference 310, after detecting the trigger to provide the measurement report, the UE may selectively provide (i.e., either provide or refrain from providing) the measurement report. In some aspects, whether the UE provides the measurement report is based at least in part on whether one or more other reference signal metrics satisfy one or more other thresholds corresponding to the one or more other reference signal metrics. For example, the UE may monitor (e.g., periodically measure) one or more other reference signal metrics (e.g., one or more reference signal metrics of the target RAT2 cell and/or one or more reference signal metrics of the RAT1 cell to which the UE is connected). In this example, if the UE detects that the one or more other reference signal metric satisfy one or more corresponding thresholds, then the UE may provide the measurement report to the base station (e.g., such that a redirection from RAT1 to RAT2 will be triggered). Conversely, if the UE detects that at least one of the one or more other reference signal metrics fail to satisfy (e.g., is less than) a corresponding threshold, then the UE may refrain from providing the measurement report to the base station (e.g., such that a redirection from RAT1 to RAT2 will not be triggered).

In some aspects, the one or more other reference signal metrics may include an RSRQ associated with the target RAT2 cell or an SNR for a reference signal associated with the target RAT2 cell. Thus, in some aspects, the one or more other thresholds may include an RSRQ threshold associated with RAT2 and an SNR threshold for the reference signal associated with RAT2.

In such a scenario, the UE may monitor the RSRQ associated with the target RAT2 cell and the SNR for the reference signal associated with the target RAT2 cell. In one example, if the UE detects that both the RSRQ and the SNR satisfy corresponding thresholds, then the UE may provide the measurement report to the base station (e.g., such that a redirection from RAT1 to RAT2 will be triggered). Conversely, if the UE detects that either the RSRQ or the SNR fail to satisfy a corresponding threshold, then the UE may refrain from providing the measurement report to the base station (e.g., such that a redirection from RAT1 to RAT2 will not be triggered). In another example, if the UE detects that either the RSRQ or the SNR satisfy corresponding thresholds, then the UE may provide the measurement report to the base station (e.g., such that a redirection from RAT1 to RAT2 will be triggered). Conversely, if the UE detects that both the RSRQ and the SNR fail to satisfy corresponding thresholds, then the UE may refrain from providing the measurement report to the base station (e.g., such that a redirection from RAT1 to RAT2 will not be triggered). Notably, in this example, the UE provides the measurement report only when the RSRP associated with the target RAT2 cell satisfies a corresponding threshold and when the RSRQ associated with the target RAT2 cell and/or the SNR associated with the target RAT2 cell satisfy corresponding thresholds. In this way, the UE may prevent a redirection to a poor target RAT2 cell, thereby preventing increased delay, preventing degraded throughput, reducing waste of network resources or UE resources, and maintaining user experience.

In some aspects, the one or more other reference signal metrics may include an RSRP associated with a RAT1 cell, a frequency tracking loop (FTL) SNR associated with a reference signal of the RAT1 cell, the RSRP associated with a target RAT2 cell, an RSRQ associated the target RAT2 cell, and an FTL SNR threshold for a reference of the target RAT2 cell. Thus, in some aspects, the one or more other thresholds include an RSRP threshold associated with RAT1, an FTL SNR threshold associated with a reference signal of RAT1, another RSRP threshold associated with RAT2, an RSRQ threshold associated RAT2, and an FTL SNR threshold for a reference signal associated with RAT2.

In such a scenario, the UE may monitor the RSRP associated with the RAT1 cell, the FTL SNR associated with the reference signal of the RAT1 cell, the RSRP associated with the target RAT2 cell, the RSRQ associated with the target RAT2 cell, and the SNR for the reference signal associated with the target RAT2 cell. In one example, if the UE detects that the RSRP associated with the RAT1 cell and the FTL SNR associated with the RAT1 cell satisfy (e.g., are greater than or equal to) corresponding thresholds, and (1) that the RSRP associated with the target RAT2 cell or (2) that the RSRQ associated with the target RAT2 cell and the FGL SNR associated with the target RAT2 cell satisfy (e.g., are less than or equal to) corresponding thresholds, then the UE may provide the measurement report to the base station (e.g., such that a redirection from RAT1 to RAT2 will be triggered). Conversely, if the UE detects that the RSRP associated with the RAT1 cell or the FTL SNR associated with the RAT1 cell fail to satisfy (e.g., are less than) corresponding thresholds, or (1) that the RSRP associated with the target RAT2 cell fails to satisfy (e.g., is less than or equal to) a corresponding threshold or (2) that the RSRQ associated with the target RAT2 cell or the FGL SNR associated with the target RAT2 cell fail to satisfy (e.g., are less than or equal to) corresponding thresholds, then the UE may refrain from providing the measurement report to the base station (e.g., such that a redirection from RAT1 to RAT2 will not be triggered). Notably, in this example, the UE provides the measurement report only when the RSRP associated with the RAT1 cell does not satisfy a corresponding threshold, the FTL SNR associated with the RAT1 cell does not satisfy a corresponding threshold, and when the RSRP associated with the target RAT2 cell and the RSRQ associated with the target RAT2 cell and/or the SNR associated with the target RAT2 cell fail to satisfy corresponding thresholds. In this way, the UE may prevent a redirection to a poor target RAT2 cell, thereby preventing increased delay, preventing degraded throughput, reducing waste of network resources or UE resources, and maintaining user experience.

In some aspects, the one or more other thresholds may be configured on the UE by a manufacturer (e.g., an original equipment manufacturer (OEM)) of the UE. That is, in some aspects, the one or more other thresholds are not configured on the UE by the base station. In some implementations, the one or more thresholds may be determined, adjusted, updated, or tuned based at least in part on wireless communication system simulations performed by the manufacturer.

As indicated above, FIG. 3 is provided as an example. Other examples may differ from what is described with respect to FIG. 3.

Figure 4:
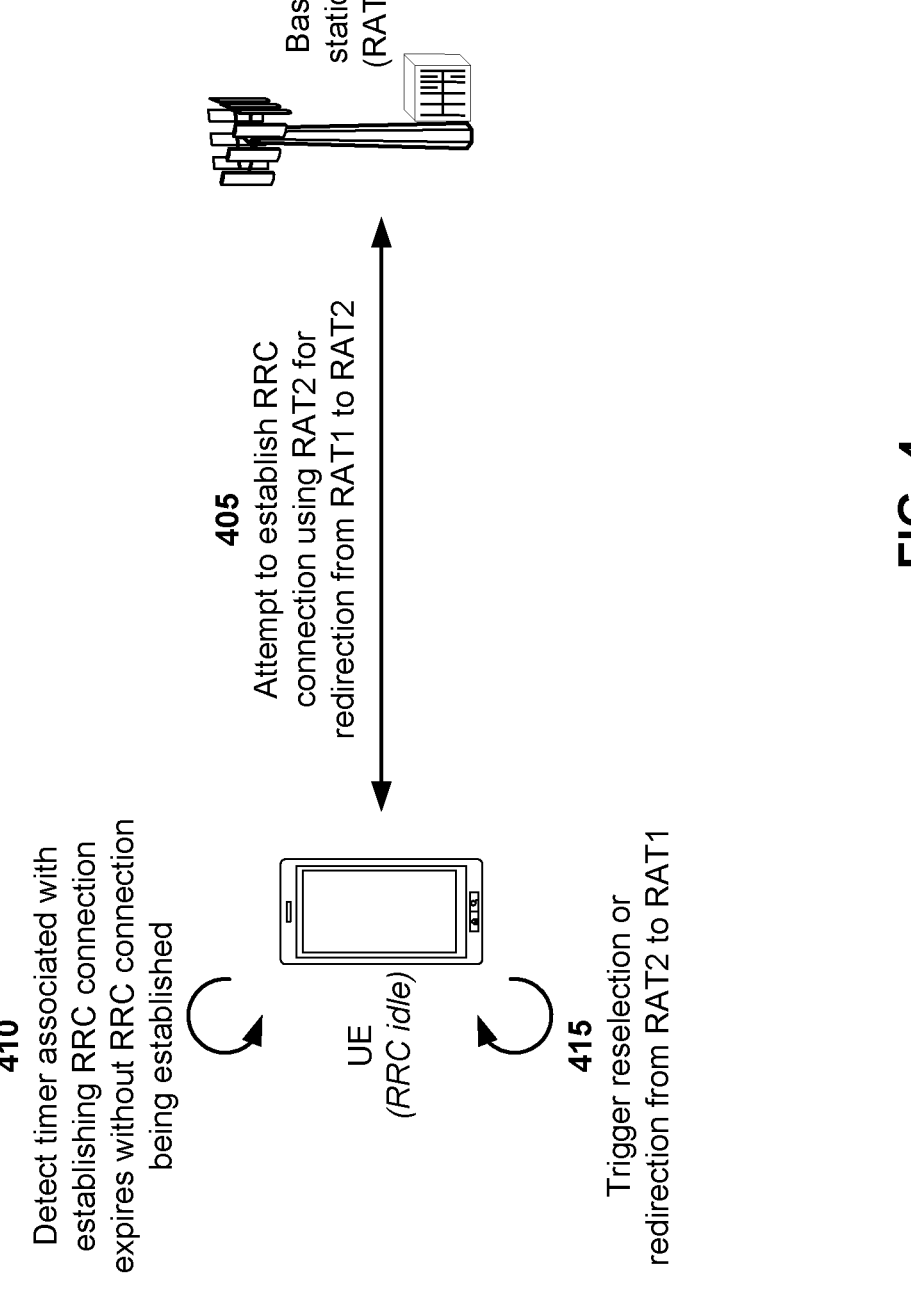

FIG. 4 is a diagram illustrating an example 400 associated with inter-RAT redirection and ping-pong improvements, in accordance with the present disclosure. As shown in FIG. 4, example 400 includes communication between a UE (e.g., a UE 120) and a base station (e.g., a base station 110). In some aspects, the base station and the UE may be included in a wireless network (e.g., a wireless network 100). The base station and the UE may communicate via a wireless access link, which may include an uplink and a downlink.

As shown by reference 405, the UE may attempt to establishing an RRC connection using RAT2 in association with performing a redirection from RAT1 to RAT2. For example, the UE may provide a measurement report to the base station based at least in part on detecting a trigger to provide the measurement report. In some aspects, the UE may selectively provide the measurement report in the manner described above with respect to FIG. 3. Here, after providing the measurement report, the UE may receive (e.g., from a base station of RAT1 to which the UE is connected) an indication to perform a redirection from RAT1 to RAT2. The UE may then attempt to establish an RRC connection using RAT2 (e.g., as part of a RAT2 standalone acquisition procedure) in association with performing the redirection from RAT1 to RAT2. In some aspects, the UE is operating in an RRC idle mode prior to attempting to establish the RRC connection using RAT2.

In some aspects, the UE may start a timer associated with establishing the RRC connection. For example, the UE may start the timer when the UE begins attempting to establish the RRC connection. In some aspects, the timer is a configurable timer (e.g., a value of the timer can be configured by the network, by an OEM, or the like).

As shown by reference 410, the UE may detect that the timer associated with establishing the RRC connection has expired without the RRC connection being established. That is, the UE may detect that the timer has expired (e.g., reached a value of 0 when counting down from an initial value, reached a threshold value when counting up from 0, or the like) without the RRC connection being established. In some scenarios, the timer may expire (i.e., the RRC connection may not be established in a timely manner) when, for example, cell selection criteria (e.g., S-criteria) for operating in the standalone mode cannot be satisfied, meaning that the RRC connection cannot be established in a timely manner.

In some aspects, as shown by reference 415, the UE may trigger a reselection or redirection from RAT2 to RAT1 based at least in part on the timer expiring without the RRC connection being established. That is, the UE may trigger a reselection or redirection from RAT2 to RAT1 when the UE determines that the timer has expired without the RRC connection being established.

In some aspects, the reselection or redirection is triggered based at least in part on information that identifies a frequency of the first RAT used by the UE prior attempting to establish the RRC connection using the second RAT. For example, the UE may trigger the reselection or redirection based on a fingerprint database to a RAT1 frequency channel number (e.g., an LTE Evolved Universal Terrestrial Radio Access (E-UTRA) Absolute Radio Frequency Channel Number (EARFCN)) that corresponds to, for example, a last camped RAT1 cell (e.g., when the UE is in a static condition). In this way, the UE may address a redirection to a poor target RAT2 cell in a timely manner (e.g., using the RRC connection establishment timer), thereby reducing delay, reducing throughput degradation, reducing waste of network resources or UE resources, or improving user experience.

In some aspects, the UE may deprioritize a frequency of RAT2 used by the UE for attempting to establish the RRC connection for a period of time (e.g., a configurable amount of time) based at least in part on the timer expiring without the RRC connection being established. In this way, the UE may prevent ping-ponging between RAT1 and RAT2 that could otherwise result from repeated redirection attempts.

As indicated above, FIG. 4 is provided as an example. Other examples may differ from what is described with respect to FIG. 4.

Figure 5:
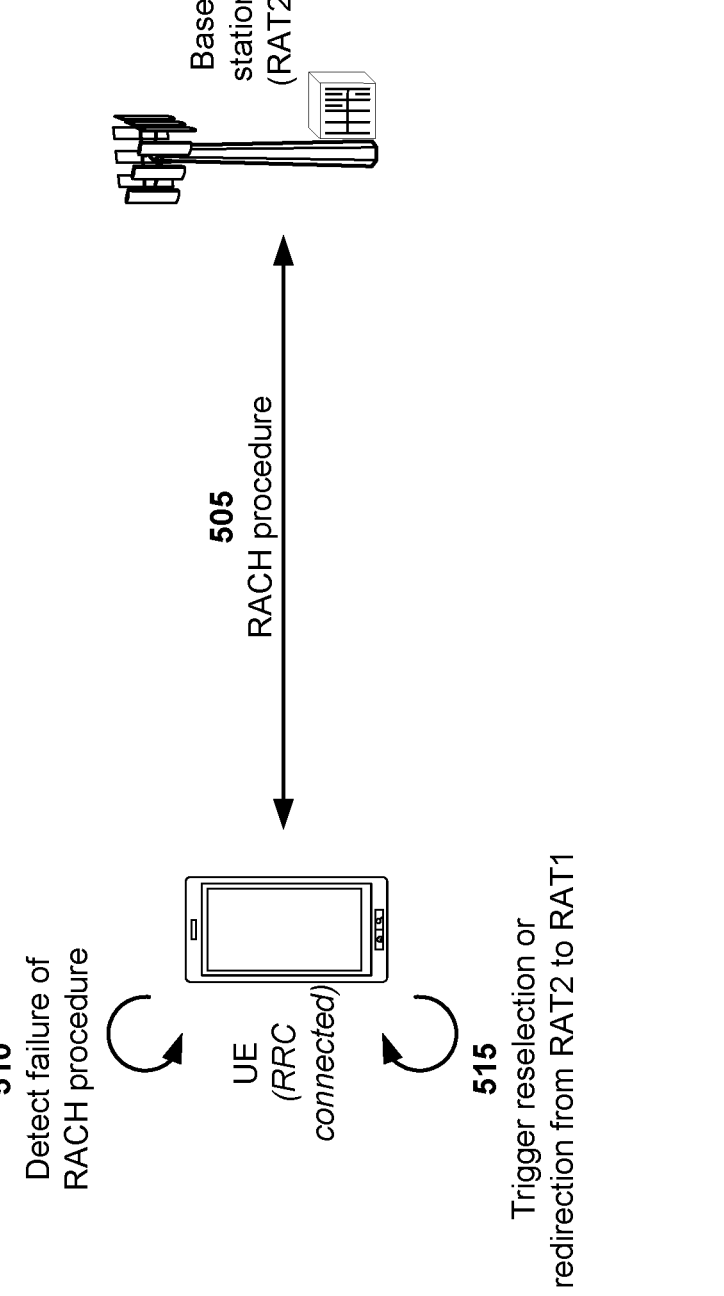

FIG. 5 is a diagram illustrating an example 500 associated with inter-RAT redirection and ping-pong improvements, in accordance with the present disclosure. As shown in FIG. 5, example 500 includes communication between a UE (e.g., a UE 120) and a base station (e.g., a base station 110). In some aspects, the base station and the UE may be included in a wireless network (e.g., a wireless network 100). The base station and the UE may communicate via a wireless access link, which may include an uplink and a downlink.

As shown by reference 505, the UE may trigger a RACH procedure after establishing an RRC connection using a RAT2 in association with performing a redirection from RAT1 to RAT2. For example, the UE may provide a measurement report to the base station based at least in part on detecting a trigger to provide the measurement report. In some aspects, the UE may selectively provide the measurement report in the manner described above with respect to FIG. 3. Here, after providing the measurement report, the UE may receive (e.g., from a base station of RAT1 to which the UE is connected) an indication to perform a redirection from RAT1 to RAT2. The UE may establish an RRC connection using RAT2 (e.g., as part of a RAT2 standalone acquisition procedure, as described above with respect to FIG. 4). Next, after establishing the RRC connection (e.g., before the timer associated with establishing the RRC connection has expired, and after completing an RRC setup procedure), the UE may trigger the RACH procedure. In some aspects, the UE is operating in an RRC connected mode prior to triggering the RACH procedure and after establishing the RRC connection using RAT2.

As shown by reference 510, the UE may detect a failure of the RACH procedure. For example, the UE may determine that a threshold amount of time has passed without the RACH procedure being completed, that a threshold number of RACH attempts have been made without completion of the RACH procedure, that a threshold number of RACH message failures have been indicated, or the like. In some aspects, the RACH procedure may fail due to poor channel conditions (e.g., channel conditions that result in a high block error ratio (BLER) in RRC connected mode).

As shown by reference 515, the UE may trigger an RRC connection release and a reselection or redirection from RAT2 to RAT1 based at least in part on detecting the failure of the RACH procedure.

In some aspects, the RRC connection release and the reselection or redirection is triggered based at least in part on information that identifies a frequency of the first RAT used by the UE prior to establishing the RRC connection using the second RAT. For example, the UE may trigger RRC connection release and the reselection or redirection based on a fingerprint database to a RAT1 frequency channel number (e.g., an LTE EARFCN) that corresponds to, for example, a last camped RAT1 cell (e.g., when the UE is in a static condition). In this way, the UE may address a redirection to a poor target RAT2 cell in a timely manner (e.g., by detecting the RACH failure), thereby reducing delay, reducing throughput degradation, reducing waste of network resources or UE resources, or improving user experience.

In some aspects, the UE may deprioritize a frequency of RAT2 used by the UE for establishing the RRC connection for a period of time (e.g., a configurable amount of time) based at least in part on the detecting the failure of the RACH procedure. In this way, the UE may prevent ping-ponging between RAT1 and RAT2 that could otherwise result from repeated redirection attempts.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., UE 120) performs operations associated with inter-radio access technology redirection and ping-pong improvements.

As shown in FIG. 6, in some aspects, process 600 may include detecting a trigger to provide a measurement report associated with a redirection from a first RAT to a second RAT, wherein the trigger is a reference signal metric associated with the second RAT satisfying a threshold associated with the reference signal metric, the threshold being configured by a base station (block 610). For example, the UE (e.g., using redirection component 908, depicted in FIG. 9) may detect a trigger to provide a measurement report associated with a redirection from a first RAT to a second RAT, wherein the trigger is a reference signal metric associated with the second RAT satisfying a threshold associated with the reference signal metric, the threshold being configured by a base station, as described above.

As further shown in FIG. 6, in some aspects, process 600 may include selectively providing the measurement report based at least in part on whether one or more other reference signal metrics satisfy one or more other thresholds corresponding to the one or more other reference signal metrics (block 620). For example, the UE (e.g., using redirection component 908, depicted in FIG. 9) may selectively provide the measurement report based at least in part on whether one or more other reference signal metrics satisfy one or more other thresholds corresponding to the one or more other reference signal metrics, as described above.

Process 600 may include additional aspects, such as any single aspect or any combination of aspects described below and/or in connection with one or more other processes described elsewhere herein.

In a first aspect, the trigger is an RSRP associated with the second RAT satisfying an RSRP threshold configured by the base station.

In a second aspect, alone or in combination with the first aspect, the one or more other thresholds include at least one of an RSRQ) threshold associated with the second RAT, or an SNR threshold for a reference signal associated with the second RAT.

In a third aspect, alone or in combination with one or more of the first and second aspects, the one or more other thresholds include at least one of an RSRP threshold associated with the first RAT, an FTL SNR threshold associated with a reference signal of the first RAT, an RSRP threshold associated with the second RAT, an RSRQ threshold associated with the second RAT, or an FTL SNR threshold for a reference signal associated with the second RAT.

In a fourth aspect, alone or in combination with one or more of the first through third aspects, the one or more other thresholds are configured on the UE by a manufacturer of the UE.

In a fifth aspect, alone or in combination with one or more of the first through fourth aspects, the one or more other thresholds are not configured on the UE by the base station.

In a sixth aspect, alone or in combination with one or more of the first through fifth aspects, selectively providing the measurement report comprises providing the measurement report when the one or more other reference signal metrics satisfy the one or more other thresholds.

In a seventh aspect, alone or in combination with one or more of the first through sixth aspects, selectively providing the measurement report comprises refraining from providing the measurement report when at least one reference signal metric of the one or more other reference signal metrics fails to satisfy a corresponding threshold of the one or more other thresholds.

In an eighth aspect, alone or in combination with one or more of the first through seventh aspects, the first RAT is LTE and the second RAT is NR.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a UE, in accordance with the present disclosure. Example process 700 is an example where the UE (e.g., UE 120) performs operations associated with inter-radio access technology redirection and ping-pong improvements.

As shown in FIG. 7, in some aspects, process 700 may include attempting to establishing an RRC connection using a second RAT in association with performing a redirection from a first RAT to the second RAT (block 710). For example, the UE (e.g., using redirection component 908, depicted in FIG. 9) may attempt to establishing an RRC connection using a second RAT in association with performing a redirection from a first RAT to the second RAT, as described above.

As further shown in FIG. 7, in some aspects, process 700 may include detecting that a timer associated with establishing the RRC connection has expired without the RRC connection being established (block 720). For example, the UE (e.g., using redirection component 908, depicted in FIG. 9) may detect that a timer associated with establishing the RRC connection has expired without the RRC connection being established, as described above.

As further shown in FIG. 7, in some aspects, process 700 may include triggering a reselection or redirection from the second RAT to the first RAT based at least in part on the timer expiring without the RRC connection being established (block 730). For example, the UE (e.g., using redirection component 908, depicted in FIG. 9) may trigger a reselection or redirection from the second RAT to the first RAT based at least in part on the timer expiring without the RRC connection being established, as described above.

Process 700 may include additional aspects, such as any single aspect or any combination of aspects described below and/or in connection with one or more other processes described elsewhere herein.

In a first aspect, the UE is operating in RRC idle mode prior to attempting to establish the RRC connection using the second RAT.

In a second aspect, alone or in combination with the first aspect, the reselection or redirection is triggered based at least in part on information that identifies a frequency of the first RAT used by the UE prior attempting to establish the RRC connection using the second RAT.

In a third aspect, alone or in combination with one or more of the first and second aspects, a frequency of the second RAT used by the UE for attempting to establish the RRC connection is deprioritized for a period of time based at least in part on the timer expiring without the RRC connection being established.

In a fourth aspect, alone or in combination with one or more of the first through third aspects, the timer is a configurable timer.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a UE, in accordance with the present disclosure. Example process 800 is an example where the UE (e.g., UE 120) performs operations associated with inter-radio access technology redirection and ping-pong improvements.

As shown in FIG. 8, in some aspects, process 800 may include triggering a RACH procedure after establishing an RRC connection using a second RAT in association with performing a redirection from a first RAT to the second RAT (block 810). For example, the UE (e.g., using redirection component 908, depicted in FIG. 9) may trigger a RACH procedure after establishing an RRC connection using a second RAT in association with performing a redirection from a first RAT to the second RAT, as described above.

As further shown in FIG. 8, in some aspects, process 800 may include detecting a failure of the RACH procedure (block 820). For example, the UE (e.g., using redirection component 908, depicted in FIG. 9) may detect a failure of the RACH procedure, as described above.

As further shown in FIG. 8, in some aspects, process 800 may include triggering an RRC connection release and a reselection or redirection from the second RAT to the first RAT based at least in part on detecting the failure of the RACH procedure (block 830). For example, the UE (e.g., using redirection component 908, depicted in FIG. 9) may trigger an RRC connection release and a reselection or redirection from the second RAT to the first RAT based at least in part on detecting the failure of the RACH procedure, as described above.

Process 800 may include additional aspects, such as any single aspect or any combination of aspects described below and/or in connection with one or more other processes described elsewhere herein.

In a first aspect, the UE is operating in RRC connected mode prior to triggering the RACH procedure and after establishing the RRC connection using the second RAT.

In a second aspect, alone or in combination with the first aspect, the reselection or redirection is triggered based at least in part on information that identifies a frequency of the first RAT used by the UE prior to establishing the RRC connection using the second RAT.

In a third aspect, alone or in combination with one or more of the first and second aspects, a frequency of the second RAT used by the UE for attempting to establish the RRC connection is deprioritized for a period of time based at least in part on detecting the failure of the RACH procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
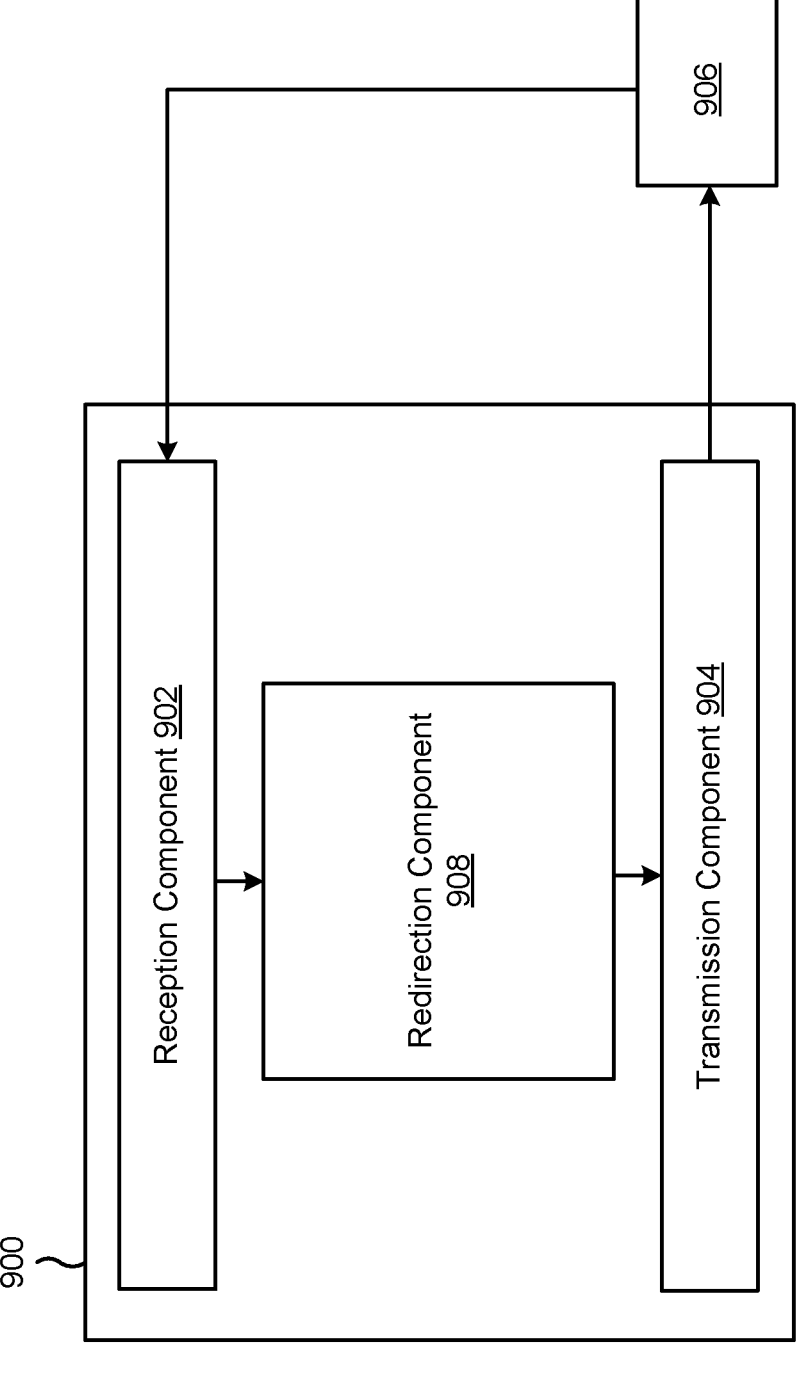
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a redirection component 908.

In some aspects, the apparatus 900 may be configured to perform one or more operations described herein in connection with FIG. 3A-3B, 4, or 5. Additionally, or alternatively, the apparatus 900 may be configured to perform one or more processes described herein, such as process 600 of FIG. 6, process 700 of FIG. 7, process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The redirection component 908 may detect a trigger to provide a measurement report associated with a redirection from a first RAT to a second RAT, wherein the trigger is a reference signal metric associated with the second RAT satisfying a threshold associated with the reference signal metric, the threshold being configured by a base station. The redirection component 908 may selectively provide the measurement report based at least in part on whether one or more other reference signal metrics satisfy one or more other thresholds corresponding to the one or more other reference signal metrics.

The redirection component 908 may attempt to establishing an RRC connection using a second RAT in association with performing a redirection from a first RAT to the second RAT. The redirection component 908 may detect that a timer associated with establishing the RRC connection has expired without the RRC connection being established. The redirection component 908 may trigger a reselection or redirection from the second RAT to the first RAT based at least in part on the timer expiring without the RRC connection being established.

The redirection component 908 may trigger a RACH procedure after establishing an RRC connection using a RAT in association with performing a redirection from a first RAT to the second RAT. The redirection component 908 may detect a failure of the RACH procedure. The redirection component 908 may trigger an RRC connection release and a reselection or redirection from the second RAT to the first RAT based at least in part on detecting the failure of the RACH procedure.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: detecting a trigger to provide a measurement report associated with a redirection from a first radio access technology (RAT) to a second RAT, wherein the trigger is a reference signal metric associated with the second RAT satisfying a threshold associated with the reference signal metric, the threshold being configured by a base station; and selectively providing the measurement report based at least in part on whether one or more other reference signal metrics satisfy one or more other thresholds corresponding to the one or more other reference signal metrics.

Aspect 2: The method of Aspect 1, wherein the trigger is a reference signal received power (RSRP) associated with the second RAT satisfying an RSRP threshold configured by the base station.

Aspect 3: The method of any of Aspects 1-2, wherein the one or more other thresholds include at least one of: a reference signal received quality (RSRQ) threshold associated with the second RAT, or a signal-to-noise ratio (SNR) threshold for a reference signal associated with the second RAT.

Aspect 4: The method of any of Aspects 1-3, wherein the one or more other thresholds include at least one of: a reference signal received power (RSRP) threshold associated with the first RAT, a frequency tracking loop (FTL) signal-to-noise ratio (SNR) threshold associated with a reference signal of the first RAT, an RSRP threshold associated with the second RAT, an RSRQ threshold associated with the second RAT, or an FTL SNR threshold for a reference signal associated with the second RAT.

Aspect 5: The method of any of Aspects 1-4, wherein the one or more other thresholds are configured on the UE by a manufacturer of the UE.

Aspect 6: The method of any of Aspects 1-5, wherein the one or more other thresholds are not configured on the UE by the base station.

Aspect 7: The method of any of Aspects 1-6, wherein selectively providing the measurement report comprises providing the measurement report when the one or more other reference signal metrics satisfy the one or more other thresholds.

Aspect 8: The method of any of Aspects 1-7, wherein selectively providing the measurement report comprises refraining from providing the measurement report when at least one reference signal metric of the one or more other reference signal metrics fails to satisfy a corresponding threshold of the one or more other thresholds.

Aspect 9: The method of any of Aspects 1-8, wherein the first RAT is Long Term Evolution (LTE) and the second RAT is New Radio (NR).

Aspect 10: A method of wireless communication performed by a user equipment (UE), comprising: attempting to establishing a radio resource control (RRC) connection using a second radio access technology (RAT) in association with performing a redirection from a first RAT to the second RAT; detecting that a timer associated with establishing the RRC connection has expired without the RRC connection being established; and triggering a reselection or redirection from the second RAT to the first RAT based at least in part on the timer expiring without the RRC connection being established.

Aspect 11: The method of Aspect 10, wherein the UE is operating in RRC idle mode prior to attempting to establish the RRC connection using the second RAT.

Aspect 12: The method of any of Aspects 10-11, wherein the reselection or redirection is triggered based at least in part on information that identifies a frequency of the first RAT used by the UE prior attempting to establish the RRC connection using the second RAT.

Aspect 13: The method of any of Aspects 10-12, wherein a frequency of the second RAT used by the UE for attempting to establish the RRC connection is deprioritized for a period of time based at least in part on the timer expiring without the RRC connection being established.

Aspect 14: The method of any of Aspects 10-13, wherein the timer is a configurable timer.

Aspect 15: A method of wireless communication performed by a user equipment (UE), comprising: triggering a random access channel (RACH) procedure after establishing a radio resource control (RRC) connection using a second radio access technology (RAT) in association with performing a redirection from a first RAT to the second RAT; detecting a failure of the RACH procedure; and triggering an RRC connection release and a reselection or redirection from the second RAT to the first RAT based at least in part on detecting the failure of the RACH procedure.

Aspect 16: The method of Aspect 15, wherein the UE is operating in RRC connected mode prior to triggering the RACH procedure and after establishing the RRC connection using the second RAT.

Aspect 17: The method of any of Aspects 15-16, wherein the reselection or redirection is triggered based at least in part on information that identifies a frequency of the first RAT used by the UE prior to establishing the RRC connection using the second RAT.

Aspect 18: The method of any of Aspects 15-17, wherein a frequency of the second RAT used by the UE for attempting to establish the RRC connection is deprioritized for a period of time based at least in part on detecting the failure of the RACH procedure.

Aspect 19: An apparatus for wireless communication at a device, comprising a processor; memory coupled with the processor; and instructions stored in the memory and executable by the processor to cause the apparatus to perform the method of one or more of Aspects 1-9

Aspect 20: A device for wireless communication, comprising a memory and one or more processors coupled to the memory, the memory and the one or more processors configured to perform the method of one or more of Aspects 1-9.

Aspect 21: An apparatus for wireless communication, comprising at least one means for performing the method of one or more of Aspects 1-9.

Aspect 22: A non-transitory computer-readable medium storing code for wireless communication, the code comprising instructions executable by a processor to perform the method of one or more of Aspects 1-9.

Aspect 23: A non-transitory computer-readable medium storing a set of instructions for wireless communication, the set of instructions comprising one or more instructions that, when executed by one or more processors of a device, cause the device to perform the method of one or more of Aspects 1-9.

Aspect 24: An apparatus for wireless communication at a device, comprising a processor; memory coupled with the processor; and instructions stored in the memory and executable by the processor to cause the apparatus to perform the method of one or more of Aspects 10-14.

Aspect 25: A device for wireless communication, comprising a memory and one or more processors coupled to the memory, the memory and the one or more processors configured to perform the method of one or more of Aspects 10-14.

Aspect 26: An apparatus for wireless communication, comprising at least one means for performing the method of one or more of Aspects 10-14.

Aspect 27: A non-transitory computer-readable medium storing code for wireless communication, the code comprising instructions executable by a processor to perform the method of one or more of Aspects 10-14.

Aspect 28: A non-transitory computer-readable medium storing a set of instructions for wireless communication, the set of instructions comprising one or more instructions that, when executed by one or more processors of a device, cause the device to perform the method of one or more of Aspects 10-14.

Aspect 29: An apparatus for wireless communication at a device, comprising a processor; memory coupled with the processor; and instructions stored in the memory and executable by the processor to cause the apparatus to perform the method of one or more of Aspects 15-18.

Aspect 30: A device for wireless communication, comprising a memory and one or more processors coupled to the memory, the memory and the one or more processors configured to perform the method of one or more of Aspects 15-18.

Aspect 31: An apparatus for wireless communication, comprising at least one means for performing the method of one or more of Aspects 15-18.

Aspect 32: A non-transitory computer-readable medium storing code for wireless communication, the code comprising instructions executable by a processor to perform the method of one or more of Aspects 15-18.

Aspect 33: A non-transitory computer-readable medium storing a set of instructions for wireless communication, the set of instructions comprising one or more instructions that, when executed by one or more processors of a device, cause the device to perform the method of one or more of Aspects 15-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   detecting a trigger to provide a measurement report associated with a redirection from a first radio access technology (RAT) to a second RAT,
      wherein the trigger is a reference signal metric associated with the second RAT satisfying a threshold associated with the reference signal metric, the threshold being configured by a base station; and
   selectively providing the measurement report based at least in part on whether one or more other reference signal metrics satisfy one or more other thresholds corresponding to the one or more other reference signal metrics.

2. The method of claim 1, wherein the trigger is a reference signal received power (RSRP) associated with the second RAT satisfying an RSRP threshold configured by the base station.

3. The method of claim 1, wherein the one or more other thresholds include at least one of:
   a reference signal received quality (RSRQ) threshold associated with the second RAT, or
   a signal-to-noise ratio (SNR) threshold for a reference signal associated with the second RAT.

4. The method of claim 1, wherein the one or more other thresholds include at least one of:
   a reference signal received power (RSRP) threshold associated with the first RAT,
   a frequency tracking loop (FTL) signal-to-noise ratio (SNR) threshold associated with a reference signal of the first RAT,
   an RSRP threshold associated with the second RAT,
   an RSRQ threshold associated with the second RAT, or
   an FTL SNR threshold for a reference signal associated with the second RAT.

5. The method of claim 1, wherein the one or more other thresholds are configured on the UE by a manufacturer of the UE.

6. The method of claim 1, wherein the one or more other thresholds are not configured on the UE by the base station.

7. The method of claim 1, wherein selectively providing the measurement report comprises providing the measurement report when the one or more other reference signal metrics satisfy the one or more other thresholds.

8. The method of claim 1, wherein selectively providing the measurement report comprises refraining from providing the measurement report when at least one reference signal metric of the one or more other reference signal metrics fails to satisfy a corresponding threshold of the one or more other thresholds.

9. The method of claim 1, wherein the first RAT is Long Term Evolution (LTE) and the second RAT is New Radio (NR).

10. An apparatus for wireless communication, comprising:
   means for detecting a trigger to provide a measurement report associated with a redirection from a first radio access technology (RAT) to a second RAT,
      wherein the trigger is a reference signal metric associated with the second RAT satisfying a threshold associated with the reference signal metric, the threshold being configured by a base station; and
   means for selectively providing the measurement report based at least in part on whether one or more other reference signal metrics satisfy one or more other thresholds corresponding to the one or more other reference signal metrics.

11. The apparatus of claim 10, wherein the trigger is a reference signal received power (RSRP) associated with the second RAT satisfying an RSRP threshold configured by the base station.

12. The apparatus of claim 10, wherein the one or more other thresholds include at least one of:
   a reference signal received quality (RSRQ) threshold associated with the second RAT, or
   a signal-to-noise ratio (SNR) threshold for a reference signal associated with the second RAT.

13. The apparatus of claim 10, wherein the one or more other thresholds include at least one of:
   a reference signal received power (RSRP) threshold associated with the first RAT,
   a frequency tracking loop (FTL) signal-to-noise ratio (SNR) threshold associated with a reference signal of the first RAT,
   an RSRP threshold associated with the second RAT,
   an RSRQ threshold associated with the second RAT, or
   an FTL SNR threshold for a reference signal associated with the second RAT.

14. The apparatus of claim 10, wherein the one or more other thresholds are configured on the apparatus by a manufacturer of the apparatus.

15. The apparatus of claim 10, wherein the one or more other thresholds are not configured on the apparatus by the base station.

16. The apparatus of claim 10, wherein the means for selectively providing the measurement report comprise means for providing the measurement report when the one or more other reference signal metrics satisfy the one or more other thresholds.

17. The apparatus of claim 10, wherein the means for selectively providing the measurement report comprise means for refraining from providing the measurement report when at least one reference signal metric of the one or more other reference signal metrics fails to satisfy a corresponding threshold of the one or more other thresholds.

18. The apparatus of claim 10, wherein the first RAT is Long Term Evolution (LTE) and the second RAT is New Radio (NR).

19. A user equipment (UE) for wireless communication, comprising:

one or more memories; and one or more processors coupled to the one or more memories, the one or more memories and the one or more processors configured to:

detect a trigger to provide a measurement report associated with a redirection from a first radio access technology (RAT) to a second RAT, wherein the trigger is a reference signal metric associated with the second RAT satisfying a threshold associated with the reference signal metric, the threshold being configured by a base station; and selectively provide the measurement report based at least in part on whether one or more other reference signal metrics satisfy one or more other thresholds corresponding to the one or more other reference signal metrics.

20. The UE of claim 19, wherein the trigger is a reference signal received power (RSRP) associated with the second RAT satisfying an RSRP threshold configured by the base station.

21. The UE of claim 20, wherein the one or more other thresholds include at least one of:

a reference signal received quality (RSRQ) threshold associated with the second RAT, or a signal-to-noise ratio (SNR) threshold for a reference signal associated with the second RAT.

22. The UE of claim 20, wherein the one or more other thresholds include at least one of:

a reference signal received power (RSRP) threshold associated with the first RAT, a frequency tracking loop (FTL) signal-to-noise ratio (SNR) threshold associated with a reference signal of the first RAT, an RSRP threshold associated with the second RAT, an RSRQ threshold associated with the second RAT, or an FTL SNR threshold for a reference signal associated with the second RAT.

23. The UE of claim 20, wherein the one or more other thresholds are configured on the UE by a manufacturer of the UE.

24. A non-transitory computer-readable medium storing a set of instructions for wireless communication, the set of instructions comprising:

one or more instructions that, when executed by one or more processors of a user equipment (UE), cause the UE to:

detect a trigger to provide a measurement report associated with a redirection from a first radio access technology (RAT) to a second RAT, wherein the trigger is a reference signal metric associated with the second RAT satisfying a threshold associated with the reference signal metric, the threshold being configured by a base station; and selectively provide the measurement report based at least in part on whether one or more other reference signal metrics satisfy one or more other thresholds corresponding to the one or more other reference signal metrics.

25. The non-transitory computer-readable medium of claim 24, wherein the trigger is a reference signal received power (RSRP) associated with the second RAT satisfying an RSRP threshold configured by the base station.

26. The non-transitory computer-readable medium of claim 24, wherein the one or more other thresholds include at least one of:

a reference signal received quality (RSRQ) threshold associated with the second RAT, or a signal-to-noise ratio (SNR) threshold for a reference signal associated with the second RAT.

27. The non-transitory computer-readable medium of claim 24, wherein the one or more other thresholds include at least one of:

a reference signal received power (RSRP) threshold associated with the first RAT, a frequency tracking loop (FTL) signal-to-noise ratio (SNR) threshold associated with a reference signal of the first RAT, an RSRP threshold associated with the second RAT, an RSRQ threshold associated with the second RAT, or an FTL SNR threshold for a reference signal associated with the second RAT.

* * * * *